E. FOURCAULT.
APPARATUS FOR THE MANUFACTURE OF GLASS SHEETS OR PLATES.
APPLICATION FILED APR. 5, 1904.

901,800.

Patented Oct. 20, 1908.

E. FOURCAULT.
APPARATUS FOR THE MANUFACTURE OF GLASS SHEETS OR PLATES.
APPLICATION FILED APR. 5, 1904.

901,800.

Patented Oct. 20, 1908.

E. FOURCAULT.
APPARATUS FOR THE MANUFACTURE OF GLASS SHEETS OR PLATES.
APPLICATION FILED APR. 5, 1904.

901,800.

Patented Oct. 20, 1908.

Witnesses:

Inventor
Emile Fourcault

UNITED STATES PATENT OFFICE.

EMILE FOURCAULT, OF LODELINSART, BELGIUM.

APPARATUS FOR THE MANUFACTURE OF GLASS SHEETS OR PLATES.

No. 901,800. Specification of Letters Patent. Patented Oct. 20, 1908.

Application filed April 5, 1904. Serial No. 201,763.

*To all whom it may concern:*

Be it known that I, EMILE FOURCAULT, glass manufacturer, subject of the King of Belgium, residing at Lodelinsart, Belgium, have invented certain new and useful Improvements in an Apparatus for the Manufacture of Glass Sheets or Plates, of which the following is a specification.

This invention has for its object to provide means for making molten glass into sheets, or plates, by solidifying it as it is raised from a bath of the molten glass so as to produce continuous sheets, or plates, of any required breadth and thickness, which are, at the same time, gradually annealed and cooled so as to permit of their being cut with a diamond or otherwise, when they leave the apparatus in a cool condition.

I will describe my invention with reference to the accompanying drawings, premising that my said invention is not limited to the precise details illustrated therein.

Figs. 1′, 1², 1³, 1⁴, 4, 5, 6 and 7 are details of parts drawn to a larger scale.

In carrying out this invention the glass may be melted in an ordinary hearth $a$, of which the drawings show only the end which the glass reaches when ready to be worked. This hearth communicates, by an opening $b$, with a small reservoir $c$ receiving the glass which is to be drawn into sheets, or plates.

A damper $d$ of refractory material, operated by a lever $e$, is provided for regulating and closing an opening $f$ so as to allow of more or less heat passing from the hearth to the reservoir $c$, thereby regulating the fluidity of the glass contained in the said reservoir.

A block, or float, of refractory material $g$ in the upper part of the said reservoir has in it a vertical slot $h$ through which the glass passes as it is being drawn into the form of sheets, or plates.

To facilitate and regulate the upward flow of the molten glass through the said slot $h$, the said block or float $g$ is more or less forced into the liquid either by means of weights, or of levers, or screws, or other suitable means, until the top of the slot $h$ is a little below the level of the molten glass in the reservoir, as hereinafter described.

An annealing apparatus $i$ having the shape of a vertical casing, or chimney, is supported above the reservoir $c$, and screws $j$ permit of its being moved vertically so as to bring it nearer to, or further from, the slot $h$ in the said block or float $g$. The casing of this annealing apparatus may be of plain sheet iron and it may be internally provided with material $i'$ which is a non-conductor of heat, such, for example, as asbestos millboard.

Rolls $k$ are arranged in pairs in this casing to move upwards the sheet or plate of glass that is being drawn, the said rolls preferably consisting of washers of asbestos (which does not scratch the glass) compressed together between metal washers by nuts $m$. Bevel wheels $n$ impart rotation to the left hand rolls, these bevel wheels gearing with other bevel wheels $n'$ keyed on a vertical shaft $o$ receiving motion through worm gearing $p$ driven by a pulley $q$ which receives its motion from any suitable motor, so that the shaft $o$ drives the driven rolls of each pair. The right hand rolls of each pair are arranged on the ends of cranked levers $r$ fitted with counterweights $s$ which press these rolls towards the driven rolls so as to cause them to bear with a suitable pressure against the glass which is in process of formation, this glass being moved forward in sheet, or plate, formed like a belt between two pulleys. The two rolls V of each pair may, however, be connected by gearing having long teeth $V^2$ so as to permit of the rolls being brought nearer together, or moved further apart, as shown on Fig. 1′. This long tooth gearing will insure the rolls being driven and should be fixed to the ends of the axes of the rolls opposite to the ends at which the bevel wheels are fixed. Doors $t$ are provided to permit the temperature of the annealing casing to be regulated and to allow of any fragments of glass being removed, and such fragments may also be directed outwardly by inclined baffle plates $u$. The two rolls V at the base of the annealing device are driven by an endless chain V'. One use of the rolls V is to prime or start the sheet or plate of glass, but the most essential function of said rolls is to institute a pressure on the sheet of glass as drawn close to the means for increasing the lateral extent of the sheet of glass to maintain the sheet in a transversely extended condition in accordance with the preliminary increase in width effected at the edges, and while the drawn sheet is in such condition that it might be modified by the longitudinal drawing action thereof at a portion which is still highly heated. By this means the drawn sheet is held also in extended condition until it has been engaged by the rollers above and when it will be in such cold state that it will be preserved in the extended condition desired. To accomplish this operation the rolls V are caused to remain in contact with the drawn sheet of glass with such pressure as to arrive at the result sought.

Figure 3:
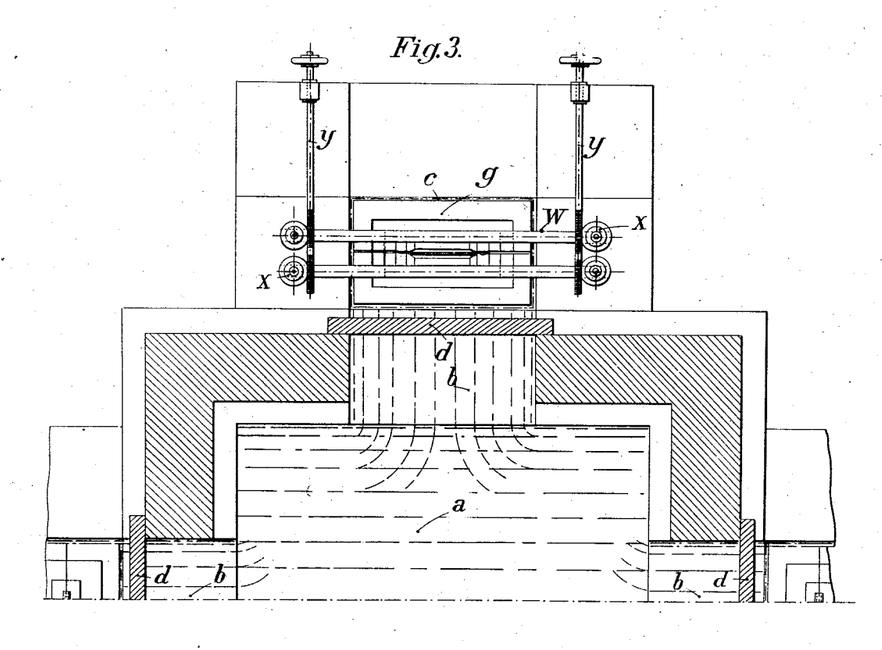
Fig. 3 is a horizontal section of apparatus in accordance with my invention.
Figure 4:
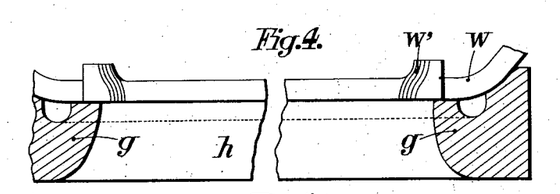
Figure 5:
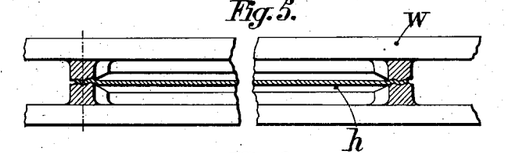
Figure 6:
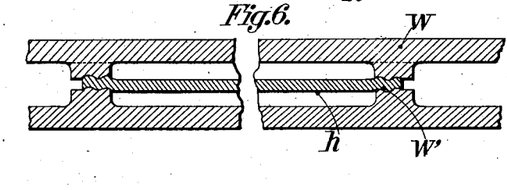
Figure 7:
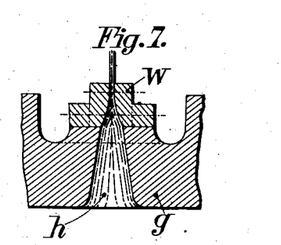

Rails W provided with grooves W' serve to catch hold of the edges of the drawn glass while it is still plastic, the grooves of these rails being so shaped that they cause the glass to be slightly stretched in a horizontal direction and avoid the formation of longitudinal ridges. The rails W and W' by their stretching action, as above noted, increase the width of the sheet of glass as it is drawn in a longitudinal direction by the bait for the reason that the glass when engaged by the rails W and W' is still in a plastic condition and capable of being stretched. It will be seen that the rails, by their stretching, increase the width of the glass equally in opposite transverse directions in addition to the function of removing longitudinal ridges, and said rails also serve to preserve the drawn sheet of uniform width throughout the operation of the bait. The said rails rest on the block or float $g$ and permit the latter to be forced more or less into the molten glass by screw gearing $x$ (Fig. 3). The distance apart of the rails is adjusted by another screw $y$.

Figure 8:
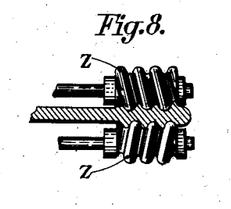
Fig. 8 illustrates a modification of a detail.

Figs. 4, 5, 6, and 7 show details of these rails on a larger scale. The said rails may be replaced by screw threaded rolls $z$ arranged as shown in Fig. 8, or by other equivalent arrangement causing a slight broadening of the glass as it is being formed and drawn, and is still plastic.

In order to start the apparatus, the glass in the reservoir $c$ should have the necessary consistency. If it be too fluid, the damper $d$ is closed a little, and if the glass be not sufficiently fluid, or too hard, the damper $d$ is opened more. It is also possible to push back momentarily the block or float $g$ into the hearth $a$ so as to melt properly the glass which is in the slot $h$ of the said block or float, the said block or float being brought back into position again in the reservoir $c$ as soon as everything is ready for the drawing of sheets or plates. A plate of metal, or of glass having metal embedded in it, is then caused to move downwards between the rolls until it dips a little into the molten glass in the slot $h$ in the block or float, when the molten glass adheres at once to the said plate and when it is raised slowly by turning the asbestos rolls in the proper direction, as indicated by the arrows, the molten glass is drawn upward in the form of a continuous sheet or plate, plastic at its base, but rapidly solidifying on contact with the surrounding air. As the sheet or plate thus produced is not in contact with any solid body while it is plastic, it is smooth on both sides, and as it solidifies before meeting the first asbestos rolls, its contact therewith does not cause it to lose this smoothness. In order to start the sheet or plate more easily, the aforesaid rolls V at the base may be used for a few minutes, these rolls being mounted on levers $r'$, $r^2$, or otherwise arranged, so that they can be easily removed from contact with the sheet or plate as soon as it reaches a certain height within the annealing casing $i$. The sheet or plate then rises slowly, passing between the successive pairs of rolls and cooling gradually as it moves towards the top of the annealing casing $i$.

When the sheet used in the priming is out of the annealing casing $i$, it can be cut from the sheet or plate of glass formed, which may be done by a diamond.

As the asbestos rolls continue to rotate, the sheet or plate of glass which is being formed rises in a continuous manner into the apparatus and is cut therefrom with a diamond as it leaves the top of the annealing casing $i$.

The sheets or plates of glass will be thinner or thicker, in accordance with the fluidity of the glass drawn in and with the speed of drawing and width of the slot $h$ in the block or float $g$. As regards the width of the sheet, it will be easy to keep it equal to the length of the slot in the block or float. It will suffice to force the float sufficiently into the molten glass to cause the supply of glass to accord with the quantity removed by the drawing operation. This is important as it enables the glass to pass, more or less, rapidly through the slot $h$ by simply varying the difference of levels which causes the flow. There is, therefore, by virtue of the pressure, a natural upward flow of a sheet or plate of molten glass of the required width and thickness which the drawing rolls keep moving upwards and prevent it falling back, while they give it time to become solidified before coming in contact with any solid body.

By operating in the aforesaid manner, very fine sheets or plates of glass are obtained, but they may present longitudinal streaks caused by the contraction of the glass immediately it leaves the slot in the block or float, while the glass is still plastic. It is to overcome this that the sheet is stretched as it leaves the said slot, which stretching is very efficiently effected by placing at the exit of the said slot $h$ the aforesaid rails W which pinch the two edges of the molten glass guided in the grooves of the said rails so that glass is stretched in a horizontal direction, the aforesaid screws $y$ enabling the distance apart of these rails to be adjusted. The said rails W may also be used to force the block or float, more or less, into the molten glass by acting on other screws $x$.

Fig. 8 shows another method of slightly stretching the base of the glass sheet or plate, by using rolls $z$ with helical grooves. These rolls should be placed immediately above the slot near the same place as the base rolls V aforesaid and driven by endless chains V'. They will slightly broaden the sheet, or plate, in process of formation and at the same time help to raise it towards the asbestos rolls.

Figure 1:
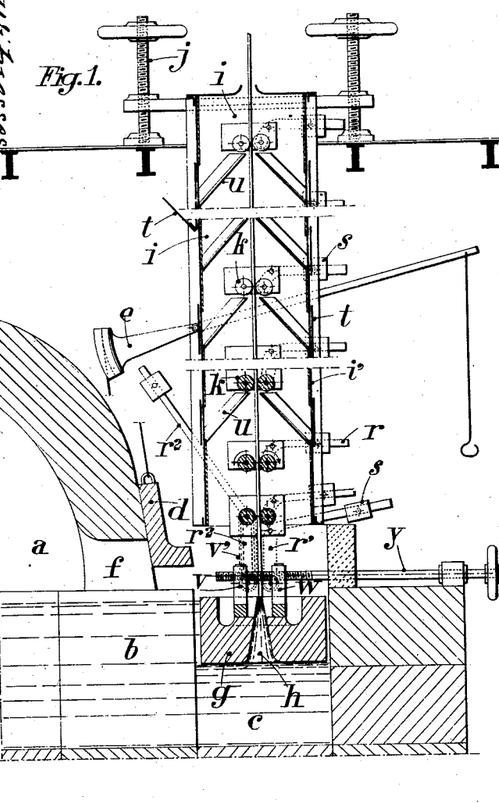
Figure 1 is a transverse section.
Figure 2:
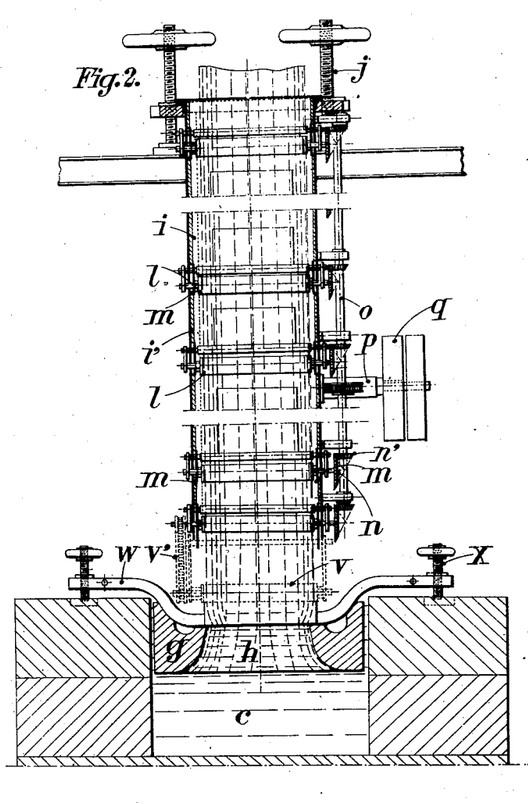
Fig. 2 is a longitudinal section.

The grooves on the edges of the glass sheet by the rails W, or by the rolls $z$ can be cut off and constitute a waste of little importance as they have but little width. It will also be possible to make longitudinal grooves on the sheet or plate of glass by either providing flutings on the whole length of the rails, Fig. $1^2$, and thus waved, or fluted glass be economically obtained in continuous sheets or plates, or shaped or ornamented sheets or plates can be produced by providing, at the end of the aforesaid endless chain V', lozenge fluted rolls, or rolls provided with any required design or pattern; and thus I can cheaply manufacture continuous sheets or plates of any required kind, such as striated glass, or glass with any required figuring or ornamentation. Fig. $1^3$ shows rolls for obtaining striated glass, and Fig. $1^4$ glass with lozenge shaped ornamentation.

The process and apparatus according to my invention does away with the use of casting slabs and scoops, or scoopers, and overcomes defects and impurities of casting, and obviates the great waste incidental to making glass plates or sheets as hitherto practiced.

The hereinbefore described means for avoiding the longitudinal streaking in the manufacture of sheets or plates of glass will not always suffice and it is further very important that all that is necessary should be done to retard the cooling of the edges and accelerate the cooling of the mid-part of the sheets or plates. This result may be obtained either by blowing cold air against the sheet or plate at the place where it begins to solidify and delivering more air towards the mid part of the sheet or plate than towards its edges, or by causing water or oil to circulate through hollow rails placed at a short distance from the sheet, or plate, to cool it by radiation, increasing the cooling towards the mid part of the sheet or plate by so curving the rails that they are nearer to the mid part of the sheet or plate than to the edges thereof. The same result may be obtained by heating the edges of the sheet or plate, which may be done by gas jets projected thereonto so as to retard the cooling of the edges and compel the glass to solidify uniformly and at the same time along the whole width of the sheet or plate.

Figure 9:
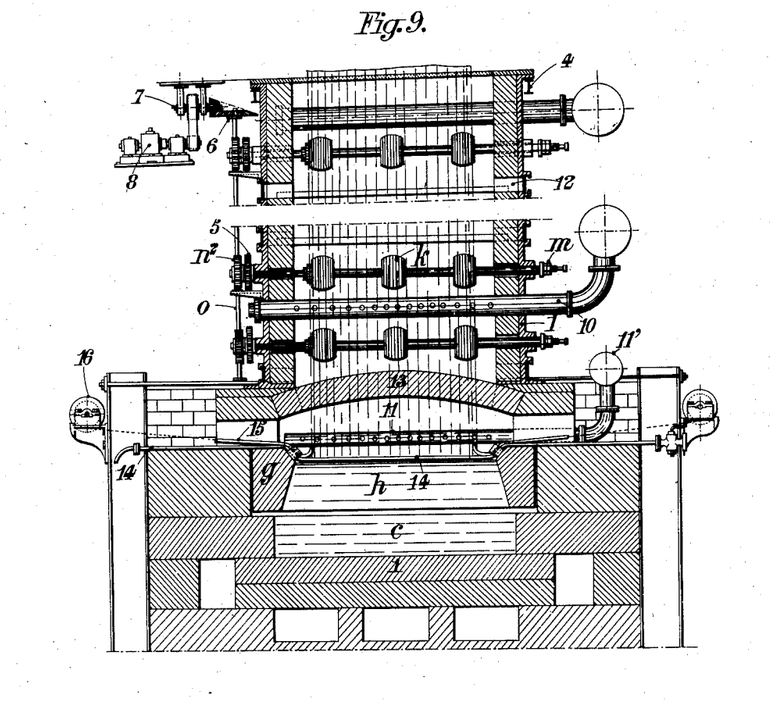
Figs. 9, 10 and 10′ show a modification of the apparatus which enables several sheets, or plates, of glass to be made at one operation, Fig. 9 being a transverse section and Figs 10 and 10′ cross sections with the upper part shown in elevation.
Figure 10:
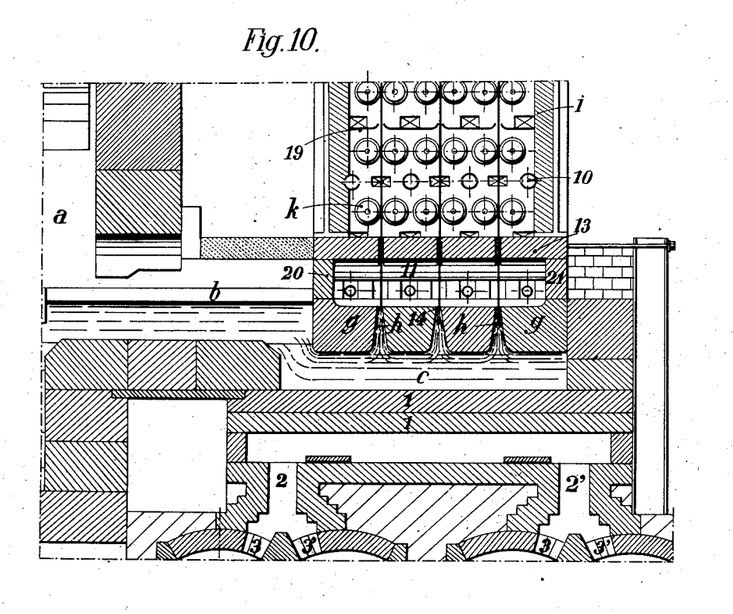

Figs. 9, 10 and 10' show a modification of the apparatus whereby several sheets can be produced in one operation and in a single apparatus.

The bottom of the small reservoir $c$ consists of two large plates 1 of refractory material which may be heated underneath, for example, by burners 2 and $2^1$ receiving hot gases and air through passages 3 and $3^1$ which are in communication with the air and gas chambers of the glass melting hearth $a$.

The top of the reservoir $c$ is closed by blocks of refractory material $g$ leaving between them intervals which are larger at the bottom than at the top so as to form long and narrow slots $h$ for the passage of the glass which is to be drawn into sheets or plates, the said slots $h$ being kept a little below the level of the glass in the reservoir so as to cause a slow flow of the glass through the slots.

The annealing device $i$ having the shape of a chimney, as hereinbefore described, can be suspended above the reservoir $c$ by joists 4 fixed to columns not shown in the drawing. The casing of this annealing apparatus consists preferably of cast iron plates bolted together and supporting a number of asbestos rolls $k$, such as those hereinbefore described, between which the continuous sheets or plates of glass are drawn. A refractory lining can be used to protect these iron plates. Each roll is connected to the next one on the same shaft by a sleeve surrounding the shaft and the nuts $m$ outside the annealing casing $l$ permit of the asbestos washers being forcibly pressed against one another. The drawing shows three rolls, but any number of component rolls may be used in each transverse line, or they may be replaced by a single one extending along the whole width of the sheet or plate, as in the previous example.

All the roll shafts are provided, at one end, with a spur wheel 5 gearing in pairs horizontally. One of the shafts of each pair carries a worm wheel $n^2$ driven by a worm $o'$ on a vertical shaft $o$, there being a worm for each worm wheel. The upper end of this vertical shaft is provided with a bevel wheel 6, which gears with a pinion on a horizontal shaft 7 provided with a driving pulley, or otherwise driven for example by a small electric motor 8.

In order to insure the contact of the asbestos rolls with the sheets or plates of glass which they have to raise, the shafts of those rolls which are not driven by the worms rotate in bearings that are elongated in a horizontal direction and springs 9 (Fig. 10') keep the wheels of the pairs of shafts in constant gear with the shafts which are driven. The teeth of the gear wheels 5 are sufficiently long to permit of the shafts being moved a little towards and away from each other without the wheels becoming disengaged. To insure proper annealing of the glass, gas passages 10 are provided from which jets of flame play onto the sheets or plates of glass to heat them, if necessary, at the parts where they would otherwise begin to cool. In order to accelerate this cooling in a methodical manner, air is blown, by means of a fan 11', into pipes 11 at the base of the annealing casing, these pipes allowing the compressed air to escape through small holes so as to mix it with the hot air in the apparatus. The escape of hot air takes place through numerous hand holes 12 which are opened, more or less, so as to obtain a regular decrease of temperature from the bottom to the top of the apparatus. The base of the annealing casing is closed by arches 13 leaving between them small spaces for the passage of continuous sheets, or plates, that are drawn from the bath through the slots $h$ in the blocks or floats.

As molten glass when too fluid is difficult to draw into sheets or plates, it is advisable to cool it at the slots $h$ in the blocks or floats, by placing in these slots metal pipes 14 cooled internally by a circulation of water, or, preferably oil, so as not to congeal the glass. Air pipes deliver jets of cold air against the sheets or plates of glass as soon as they (still in a pasty state) issue from the slots $h$, these jets of cold air having for their object to soldify the sheets of glass as soon as possible. Metal sheets 19, with turned up edges are placed between each pair of rolls to retain glass fragments, and these are collected from time to time through the hand holes 12. These metal sheets 19 serve also to retain and localize the heat towards the lower part of the casing so as to prevent the heat escaping too rapidly upwards, thereby insuring a more regular and methodical temperature.

To start this apparatus it must be heated to a suitable temperature before molten glass is admitted thereto.

The lower part of the reservoir $c$ for receiving the molten glass is heated by burning the gas at the passages 2 and $2^1$ the heat maintaining the molten glass in a suitable state of fluidity.

To heat the top of the reservoir $c$ and the blocks, or floats, $g$, the walls 20 and 21 are removed, as also may be the air pipes 15 and the pipes 14 and the side openings used as hand holes are stopped so that the heat from the hearth heats the tops of the blocks, or floats, and the underside of the arches 13 above them before escaping into the atmosphere. When this has been going on for a few hours, the apparatus will be sufficiently hot for molten glass to be passed into the reservoir. The glass is kept in the hearth $a$ of the glass melting furnace by means of a provisional weir made of a few blocks placed in the channel $b$ leading to the reservoir, this weir being removed when the reservoir $c$ is ready to receive the molten glass. As soon as the reservoir is full of molten glass, the walls 20 and 21 which were removed are replaced, so as to isolate the blocks or floats from the heat of the hearth and the air pipes 15 and pipes 14, if they had been removed, are also replaced. The apparatus is then ready for work. The plates used as aforesaid for drawing up the glass are lowered between the asbestos rolls $k$ by introducing them through slots provided at the top of the annealing casing $i$ and causing the rolls to revolve in a direction opposite to that for drawing up the glass.

If it is necessary, in order to insure a good annealing of the sheets or plates of glass, to re-heat them a little when they are solidified, the gas jets from the aforesaid passages 3 will be lighted but the temperature should not exceed 700° or 800° centigrade so as to avoid softening the glass too much. When this is done, the sheets or plates of glass, as they rise, are cooled slowly and gradually, which is done by opening, more or less, the hand holes 12 in the annealing casing so as to allow of the escape of heat and, if necessary, some cold air can be blown in through the air pipes at the upper part of the apparatus.

In the operation of the foregoing apparatus the maximum quantity of the glass as picked up by the bait is increased in width independently of any rolling apparatus which is understood to perform the so-called "stretching" operation, or to receive the glass and maintain it in a transversely extended condition and obstruct stringing of the glass sheet as it is longitudinally drawn. By the operation of the foregoing apparatus the glass is positively increased in width, while the glass is in high molten condition, the increase in width being effected at the edges and the sheet of glass drawn then subjected to the pressure of a plurality of rollers to maintain it in laterally extended condition as desired during the longitudinal drawing action of the bait.

Figure 11:
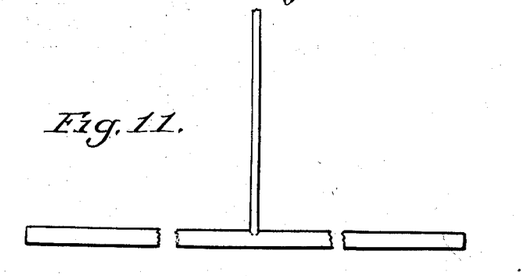
Fig. 11 is a diagrammatic view partially broken away showing a bait adapted for use with the apparatus.

Any suitable form of bait may be used in the apparatus for drawing a sheet of glass, and Fig. 11 diagrammatically illustrates a bait, partially broken away, and this conventional showing is intended to demonstrate that the apparatus is not limited in its operation to any precise form of bait.

Having thus described the invention, what is claimed, is:

1. In an apparatus of the class set forth, a molten glass receptacle, mechanism for upwardly drawing an endless sheet of glass from the said receptacle, and a vertical casing inwardly heated by heat radiated from the molten glass and from the said receptacle, the means and mechanism for drawing the endless sheet of glass being located within the casing and operating to draw the glass vertically within the latter and cause the sheet to cool gradually and regularly to present it in proper condition at the upper part of the casing for cutting into desired lengths.

2. In an apparatus of the class set forth, a receptacle for molten glass, a movable vertical casing adapted to be arranged near the receptacle, a plurality of horizontal pairs of drawing rolls provided with an incombustible and glass non-scratching means, and means for actuating the rolls, the rolls coming into contact with the glass solely when the latter is hot and wholly solidified and operating to draw the endless sheet of glass upwardly within the casing by their mutual motion.

3. In an apparatus of the class set forth, a casing carrying a plurality of pairs of rolls, one of the rolls of each pair being fixed and the other movable, and means for causing the movable rolls to be automatically brought nearer to the fixed rolls or removed from the latter, in combination with means for drawing a sheet of glass.

4. In an apparatus of the class set forth, a casing carrying a plurality of pairs of drawing rolls, one of the rolls of each pair having means coöperating therewith for automatically bringing it nearer to the other, and a plurality of transverse partitions or diaphragms located within the casing and arranged to permit the passage of an endless sheet of glass therethrough and operating to keep the heat radiated from the molten glass in the lower part of the casing.

5. In an apparatus of the class set forth, a casing carrying a plurality of pairs of drawing rolls, and a plurality of inner transverse partitions or diaphragms in the casing and a series of lateral apertures or man-holes formed in the walls of the latter and having means for closing the same, the said apertures or man-holes permitting the removal of bits of broken glass and if necessary the escape of the excess of heat from the casing.

6. In an apparatus of the class set forth, a casing carrying a plurality of drawing rolls, a plurality of transverse partitions or diaphragms within the casing and a series of lateral apertures or man-holes in the walls of said casing, the apertures or man-holes being provided with closing means and the inner surfaces of the walls of the casing covered with heat non-conducting material.

7. In an apparatus of the class set forth, a casing having an inner coating of heat non-conducting material and carrying a plurality of drawing rolls, a plurality of transverse partitions or diaphragms within the casing and a series of lateral apertures formed in the walls of said casing and having closing means, a pair of adjustable and rotatable rolls connected to the casing, and a molten glass reservoir, the rolls coming into contact with the malleable lower extremity of the endless sheet of glass near the reservoir.

8. In an apparatus of the class set forth, the combination with a molten glass reservoir, of a casing coöperating therewith and having means for upwardly drawing an endless sheet of glass from the reservoir, and a metallic pipe having a fluid circulating therethrough and immersed in the molten glass in the reservoir beneath the level of the glass and near the lower extremity of the drawn sheet.

9. In an apparatus of the class set forth, the combination with a casing for vertically drawing an endless sheet of glass, of a pair of metallic bars provided with divergent ribs which are pressed against the malleable lower extremity of the drawn sheet of glass to obtain a horizontal stretching of the glass sheet simultaneously with the vertical drawing of the latter.

10. In a glass drawing machine, the combination of a receptacle for molten glass, means for drawing a sheet of glass therefrom, means for preliminarily increasing the width of the glass at opposite edges, means whereby the sheet is held to uniform width after it is increased at the opposite edges, and mechanism for operating said drawing and width increasing and sheet holding means.

11. In a glass drawing machine, the combination of a receptacle for molten glass, means for drawing a sheet of glass therefrom, means for preliminarily increasing the width of the glass at opposite edges, means whereby the sheet is held to uniform width after it is increased at opposite edges, means for lowering the temperature of the sheet as drawn, and mechanism for operating said drawing and width increasing and holding means.

12. In a glass drawing machine, the combination of a receptacle for molten glass, means for drawing a sheet of glass therefrom, means for preliminarily increasing the width of the glass at opposite side edges, means for holding the glass to uniform width after it is increased at the opposite edges, means for cooling the sheet as drawn, and mechanism for operating the drawing and width increasing and holding means.

13. In a glass drawing apparatus, the combination of a receptacle for molten glass, means for drawing a sheet of glass therefrom, means for preliminarily increasing the width of the glass at opposite side edges and operating in planes at right angles to the direction of movement of the sheet as drawn, and means for maintaining the sheet to a uniform width after it has been increased at opposite edges.

14. In a glass drawing apparatus, the combination of a receptacle for molten glass, means for drawing a sheet of glass therefrom, means for preliminarily increasing the width of the glass at opposite edges and operating in planes at right angles to the movement of the sheet as drawn, means for lowering the temperature of the sheet as drawn, and means for maintaining the sheet at a uniform width after it has been preliminarily increased in width at the opposite edges.

15. In a glass drawing apparatus, the combination of a receptacle for molten glass, means for drawing a sheet of glass therefrom, means for maintaining the level of the glass in such receptacle approximately constant as the sheet is drawn, means for preliminarily increasing the width of the sheet at opposite edges, and means for maintaining the sheet to uniform width after it is increased at the edges.

16. In a glass drawing apparatus, the combination of a receptacle for molten glass, means for drawing a sheet of glass therefrom, means for maintaining the level of the glass in said receptacle approximately constant as the sheet is drawn, means for preliminarily increasing the width of the sheet of glass at opposite edges, means maintaining the sheet to uniform width after it is increased at the opposite edges, and means lowering the temperature of the sheet as drawn.

17. In a glass drawing apparatus, the combination of a receptacle for molten glass, means for drawing a sheet of glass therefrom, means maintaining the level of the glass in said receptacle approximately constant as the sheet is drawn, means preliminarily increasing the width of the sheet at opposite edges, means maintaining the sheet to uniform width after it is increased at the edges, and cooling devices for the sheet as drawn.

18. In a glass drawing apparatus, the combination of a receptacle for molten glass, means for varying the level of the glass in said receptacle, means for drawing a sheet of glass from the receptacle, means preliminarily increasing the width of the sheet at opposite edges, and means for maintaining the sheet to uniform width after it is increased at opposite edges.

19. In a glass drawing apparatus, the combination of a receptacle for molten glass, means for varying the level of the glass in said receptacle, sheet drawing devices, means preliminarily increasing the width of the sheet as drawn at opposite edges, means for maintaining the sheet to uniform width after it is increased at the edges, and a cooling device for the sheet.

20. In a glass drawing apparatus, the combination of a receptacle for molten glass, sheet drawing devices, means for preliminarily increasing the width of the sheet at opposite edges, means for maintaining the sheet to uniform width after it is increased at opposite edges, and means for adjusting the preliminary width increasing means.

21. In an apparatus for forming sheet glass, the combination of a receptacle for molten glass, a bait for drawing a glass sheet therefrom, means for increasing the width of the sheet of glass at its edges as drawn by the bait, and rolling means engaging the glass sheet after it is increased in width.

22. In an apparatus for forming sheet glass, the combination of a receptacle for molten glass, a bait for drawing a glass sheet therefrom, means for preliminarily increasing the width of the sheet, and means independent of the preliminary width increasing means for engaging the sheet and acting in opposition to the longitudinal drawing action of the bait.

23. In an apparatus for drawing sheet glass, the combination of a receptacle for molten glass, a bait, means for moving the bait away from said receptacle to draw a sheet, means preliminarily coöperating with the edges of the sheet to increase the width of the latter as the sheet is drawn by the bait, and rolling devices engaging the sheet after it is increased in width.

24. In an apparatus for drawing sheet glass, the combination of a receptacle for molten glass, a bait, means withdrawing said bait from said receptacle to form a sheet, preliminary means for engaging the edges of the sheet to increase the width of the latter and located close to the molten glass in the receptacle, and means engaging the sheet after it is increased in width to maintain the desired width of the sheet.

25. In an apparatus for drawing sheet glass, the combination of a receptacle for molten glass, a bait for drawing a sheet of glass from the receptacle, means located adjacent to and engaging each edge of the sheet and operating to increase the width of the latter, and means engaging the sheet after increase of its width.

26. In an apparatus for drawing sheet glass, the combination with a receptacle for molten glass, a bait, and means withdrawing said bait from said receptacle to form a sheet, of preliminary width increasing means engaging the opposite edges of the sheet, and rolling means subsequently engaged by the sheet and acting in coöperation with the drawing action of the bait.

27. In an apparatus for drawing sheet glass, the combination of a receptacle containing molten glass, means for drawing a sheet of glass therefrom, means for preliminarily increasing the width of the glass at opposite edges, and means whereby the sheet is held to uniform width after it is increased at the opposite edges.

28. In an apparatus for drawing sheet glass, a receptacle containing molten glass, means for drawing glass therefrom in sheet form in a longitudinal direction, means for preliminarily increasing the width of the sheet of glass, and means for secondarily holding the sheet to uniform width after it is increased in width and as it is longitudinally drawn.

29. In an apparatus for drawing sheet glass, a receptacle containing molten glass, means for drawing glass therefrom in sheet form in a longitudinal direction, a plurality of surfaces preliminarily operating upon the edge portions of the glass sheet to increase the width of the latter, and secondary sheet engaging devices to hold the said sheet to uniform width, the preliminary increase of width of the sheet of glass being effected simultaneously with the longitudinal drawing action imposed on the sheet.

In testimony whereof I have hereunto set my hand in presence of two subscribing witnesses.

EMILE FOURCAULT.

Witnesses:
    JACQUES DETHIER,
    JEANNE LIÉTART.